(12) United States Patent
Mikuriya et al.

(10) Patent No.: US 10,091,614 B2
(45) Date of Patent: Oct. 2, 2018

(54) INFORMATION PROCESSING APPARATUS, IMAGE PROCESSING APPARATUS, AND NON-TRANSITORY COMPUTER READABLE STORAGE MEDIUM

(71) Applicant: FUJI XEROX CO., LTD., Tokyo (JP)

(72) Inventors: Hiroshi Mikuriya, Kanagawa (JP); Eiji Nishi, Kanagawa (JP); Chigusa Nakata, Kanagawa (JP); Takeshi Furuya, Kanagawa (JP); Ryuichi Ishizuka, Kanagawa (JP); Kenji Kuroishi, Kanagawa (JP); Yoshihiro Sekine, Kanagawa (JP); Hiroshi Honda, Kanagawa (JP); Keita Sakakura, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/479,808

(22) Filed: Apr. 5, 2017

(65) Prior Publication Data

US 2018/0176732 A1  Jun. 21, 2018

(30) Foreign Application Priority Data

Dec. 16, 2016  (JP) ................. 2016-244886

(51) Int. Cl.
 *H04W 4/02* (2018.01)
 *H04N 1/44* (2006.01)
 *H04N 1/00* (2006.01)

(52) U.S. Cl.
 CPC ........ *H04W 4/023* (2013.01); *H04N 1/00307* (2013.01); *H04N 1/4426* (2013.01); *H04N 2201/0094* (2013.01)

(58) Field of Classification Search
 CPC ............ H04N 1/00307; H04N 1/4426; H04N 2201/0094; H04W 4/023
 USPC ....................................................... 358/1.15
 See application file for complete search history.

(56) References Cited

U.S. PATENT DOCUMENTS

| | | | |
|---|---|---|---|
| 8,934,113 B2 * | 1/2015 | Hosoda | H04N 1/00204 358/1.14 |
| 2004/0267840 A1 | 12/2004 | Ono | |
| 2007/0076254 A1 * | 4/2007 | Reilly | G06F 3/1206 358/1.15 |
| 2011/0261405 A1 * | 10/2011 | Ito | G06F 1/3203 358/1.15 |
| 2013/0050741 A1 * | 2/2013 | Raja | G06F 3/1204 358/1.15 |

(Continued)

FOREIGN PATENT DOCUMENTS

| | | |
|---|---|---|
| JP | 2004-233071 A | 8/2004 |
| JP | 2008-170309 A | 7/2008 |

*Primary Examiner* — Allen H Nguyen
(74) *Attorney, Agent, or Firm* — Oliff PLC

(57) ABSTRACT

An information processing apparatus includes
 a mobile position information acquiring unit configured to acquire position information obtained by a mobile terminal possessed by an operator who operates a machine, and
 an instruction unit configured to issue an instruction concerning acquisition of the position information of the mobile terminal when a difference between a position obtained from the position information of the mobile terminal acquired by the mobile position information acquiring unit and a position of the machine exceeds a predetermined first criterion.

8 Claims, 9 Drawing Sheets

(56) References Cited

U.S. PATENT DOCUMENTS

2013/0057910 A1* 3/2013 Matsumoto .......... G06K 15/402
358/1.15
2016/0345137 A1* 11/2016 Ruiz ....................... H04W 4/04

* cited by examiner

INFORMATION PROCESSING APPARATUS, IMAGE PROCESSING APPARATUS, AND NON-TRANSITORY COMPUTER READABLE STORAGE MEDIUM

CROSS-REFERENCE TO RELATED APPLICATIONS

This application is based on and claims priority under 35 USC 119 from Japanese Patent Application No. 2016-244886 filed Dec. 16, 2016.

BACKGROUND

Technical Field

The present invention relates to an information processing apparatus, an image processing apparatus, and a non-transitory computer readable storage medium.

SUMMARY

According to a first aspect of the invention, an information processing apparatus includes a mobile position information acquiring unit configured to acquire position information obtained by a mobile terminal possessed by an operator who operates a machine, and an instruction unit configured to issue an instruction concerning acquisition of the position information of the mobile terminal when a difference between a position obtained from the position information of the mobile terminal acquired by the mobile position information acquiring unit and a position of the machine exceeds a predetermined first criterion.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the accompanying drawings.

First Exemplary Embodiment

<System Configuration>

Figure 1:
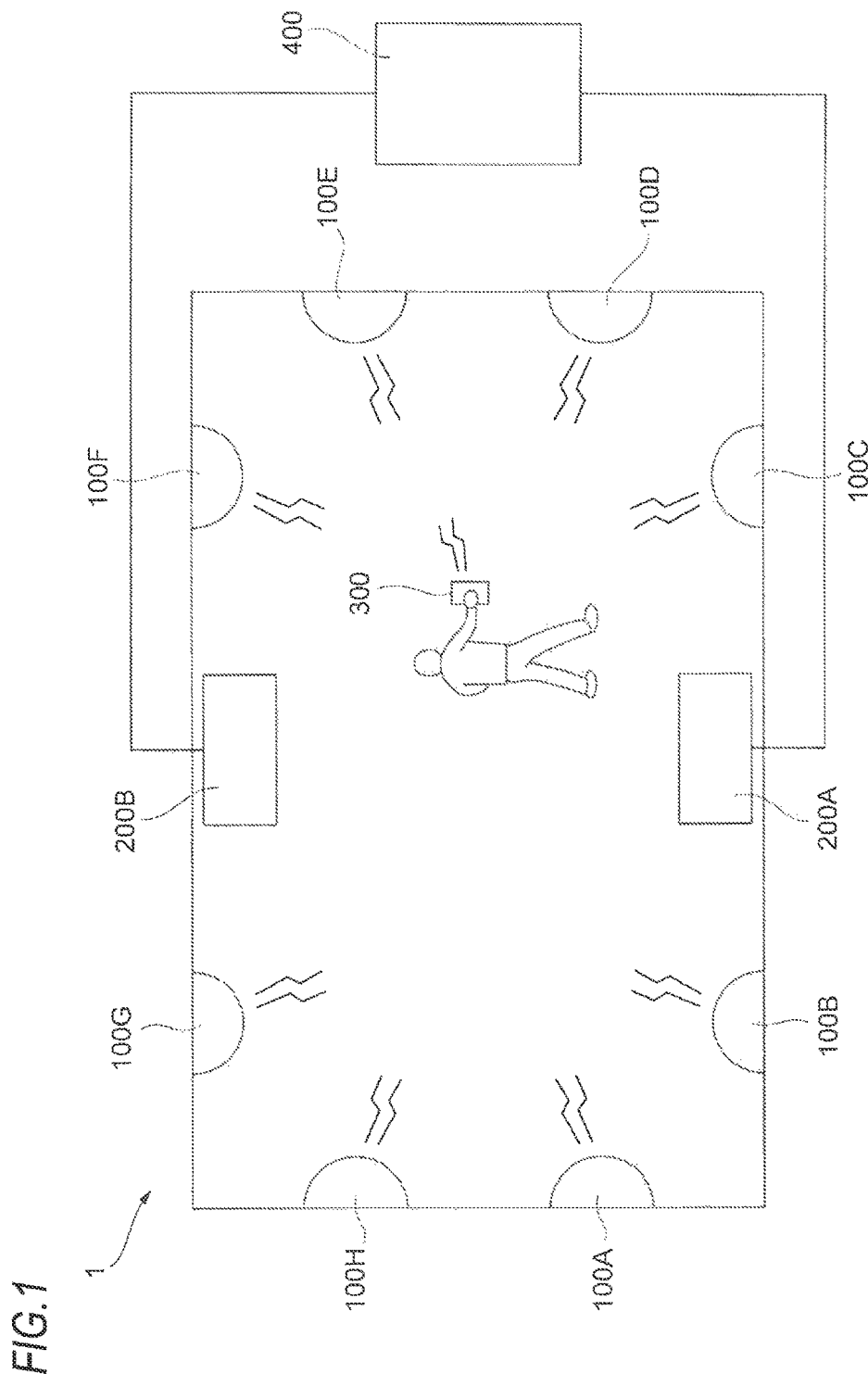
FIG. 1 is a view illustrating an exemplary overall configuration of a positioning system according to a first exemplary embodiment.

First, the overall configuration of a positioning system 1 according to a first exemplary embodiment will be described. FIG. 1 is a view illustrating an example of the overall configuration of the positioning system 1 according to the first exemplary embodiment. As illustrated in the figure, the positioning system 1 includes plural transmitters 100A to 100H, plural image processing apparatuses 200A and 200B, a mobile terminal 300 and a management server 400. In this example, the transmitters 100A to 100H, the image processing apparatuses 200A and 200B and the management server 400 are fixed. On the other hand, it is assumed that the mobile terminal 300 is possessed by an operator and that the mobile terminal 300 is moved as the operator moves.

In addition, although the transmitters 100A to 100H are illustrated in FIG. 1, they may be sometimes collectively referred to as a transmitter 100 when it is unnecessary to distinguish between them. In addition, although eight transmitters 100A to 100H are illustrated in FIG. 1, the number of transmitters 100A to 100H is not limited to eight as illustrated. Similarly, although the image processing apparatuses 200A and 200B are illustrated in FIG. 1, they may be sometimes collectively referred to as an image processing apparatus 200 when it is not necessary to distinguish between them. In addition, although two image processing apparatuses 200A and 200B are illustrated in FIG. 1, the number of image processing apparatuses 200A and 200B is not limited to two as illustrated. Further, although one mobile terminal 300 is illustrated in FIG. 1, the mobile terminal 300 may be possessed by each of plural operators. That is, the number of mobile terminals 300 is not limited to one as illustrated.

The transmitters 100A to 100H are arranged on an indoor wall or the like, and transmit radio waves to the surroundings of their own (transmitter 100) at a certain cycle, for example. The transmitter 100 may be one using the technology of iBeacon®, for example.

The image processing apparatuses 200A and 200B are so-called multifunction device equipped with various image processing functions such as a printing function, an image reading function (scanning function), a copying function and a facsimile function. For example, the image processing apparatus 200 forms an image on a recording medium such as paper by a printing function, or reads an image on a document by an image reading function to generate image data.

Further, the image processing apparatus 200 has an authentication function. For example, when an operator executes image processing such as printing or image reading with the image processing apparatus 200, the operator touches an integrated circuit (IC) card such as his/her own employee ID card to an IC card reader of the image processing apparatus 200 for authentication. When the authentication is performed, image processing such as printing or image reading is executed by the image processing apparatus 200.

In the present exemplary embodiment, the image processing apparatus 200 is used as an example of a machine to be operated by the operator.

The mobile terminal 300 is a mobile terminal type computer device such as a smartphone, a mobile phone, a tablet personal computer (PC), a notebook PC or the like. The mobile terminal 300 is compliant with a wireless local area network (LAN) standard such as Bluetooth®, Wi-Fi (Wireless Fidelity)® or the like for radio communication. Then, the mobile terminal 300 receives radio waves emitted from the transmitters 100A to 100H, and periodically performs positioning, for example, every one second, based on the intensities of the received radio waves.

More specifically, the mobile terminal 300 receives the radio waves emitted from the transmitters 100A to 100H by, for example, BLE (Bluetooth Low Energy) which is one of extended specifications of Bluetooth. Then, the mobile terminal 300 measures the intensities of the received radio waves and identifies a position of its own (mobile terminal 300) based on the measured radio wave intensities. Once the position of its own is identified, the mobile terminal 300 calculates position information indicating the identified position and transmits the calculated position information to the management server 400 by wireless communication. The position information may be, for example, latitude and longitude coordinates.

The management server 400 as an example of an information processing apparatus is a computer device that receives and processes data sent from other apparatus/device such as the image processing apparatus 200 and the mobile terminal 300. The management server 400 may be, for example, a PC, a workstation or the like.

In this exemplary embodiment, when the operator performs the authentication with the image processing apparatus 200, the management server 400 compares a position obtained from the position information acquired from the mobile terminal 300 of the operator with a position of the image processing apparatus 200 with which the authentication is performed. Then, when a positional deviation (distance difference) between the mobile terminal 300 and the image processing apparatus 200 exceeds a predetermined reference (threshold), the management server 400 issues, to the mobile terminal 300, an instruction concerning acquisition of the position information of the mobile terminal 300 (hereinafter referred to as a calibration instruction). As will be described in detail later, this calibration instruction is an instruction to change (calibrate) a calculation procedure for calculating the position information of the mobile terminal 300 based on the intensity of a radio wave received from the transmitter 100 by the mobile terminal 300.

<Hardware Configuration of Management Server>

Figure 2:
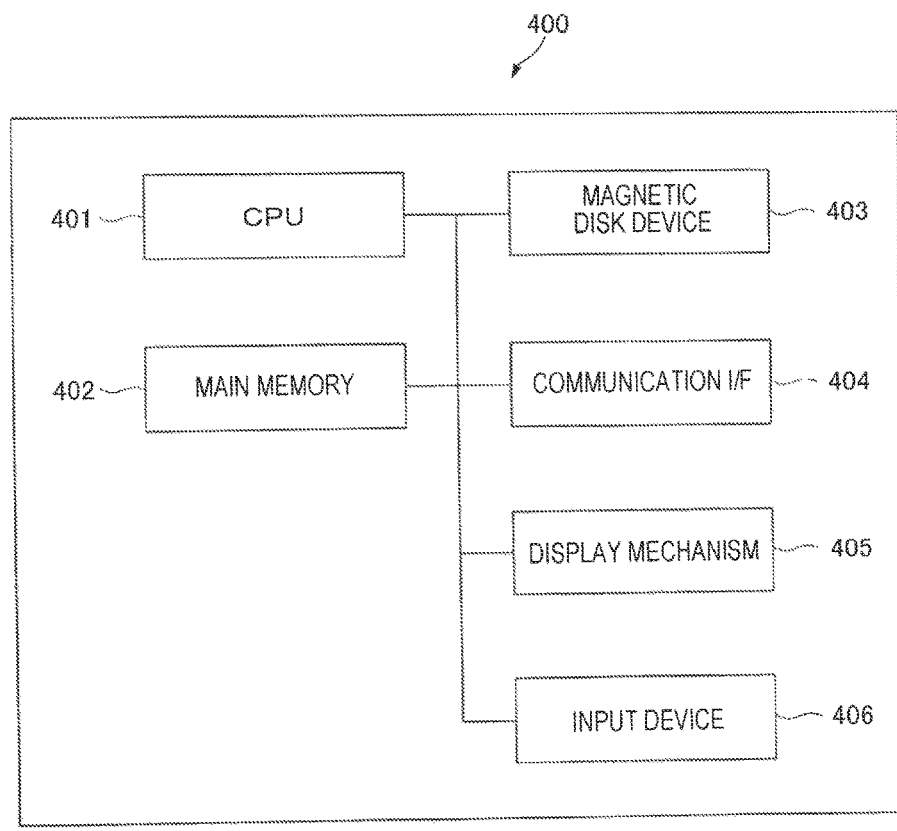
FIG. 2 is a view illustrating an exemplary hardware configuration of a management server according to the first exemplary embodiment.

Next, a hardware configuration of the management server 400 according to the present exemplary embodiment will be described. FIG. 2 is a view illustrating an exemplary hardware configuration of the management server 400 according to the first exemplary embodiment. As illustrated in the figure, the management server 400 includes a central processing unit (CPU) 401 as a computing unit, and a main memory 402 and a magnetic disk device 403 which serve as a storage unit.

In this exemplary embodiment, the CPU 401 executes various programs such as an operating system (OS) and applications to realize various functions of the management server 400. The main memory 402 is a memory area for storing various programs and data used for execution thereof. The magnetic disk device 403 is a memory area for storing input data for various programs, output data from various programs, and the like. Then, the CPU 401 realizes the respective functions of the management server 400, for example, by loading and executing various programs stored in the magnetic disk device 203 into the main memory 402.

The management server 400 further includes a communication interface (hereinafter, referred to as a "communication I/F") 404 for communicating with the external, a display mechanism 405 including a video memory, a display and the like, and an input device 406 including operation buttons, a keyboard, a mouse and the like. The communication I/F 404 includes an interface for performing wired communication and an interface (antenna) for performing wireless communication, and serves as a communication interface for exchanging various data with other apparatus/device such as the image processing apparatus 200 and the mobile terminal 300.

FIG. 2 merely illustrates a hardware configuration of the management server 400 suitable for application of the present exemplary embodiment. The present exemplary embodiment is not realized only with the illustrated configuration.

The mobile terminal 300 may also have the common hardware configuration to the management server 400 illustrated in FIG. 2.

<Hardware Configuration of Image Processing Apparatus>

Figure 3:
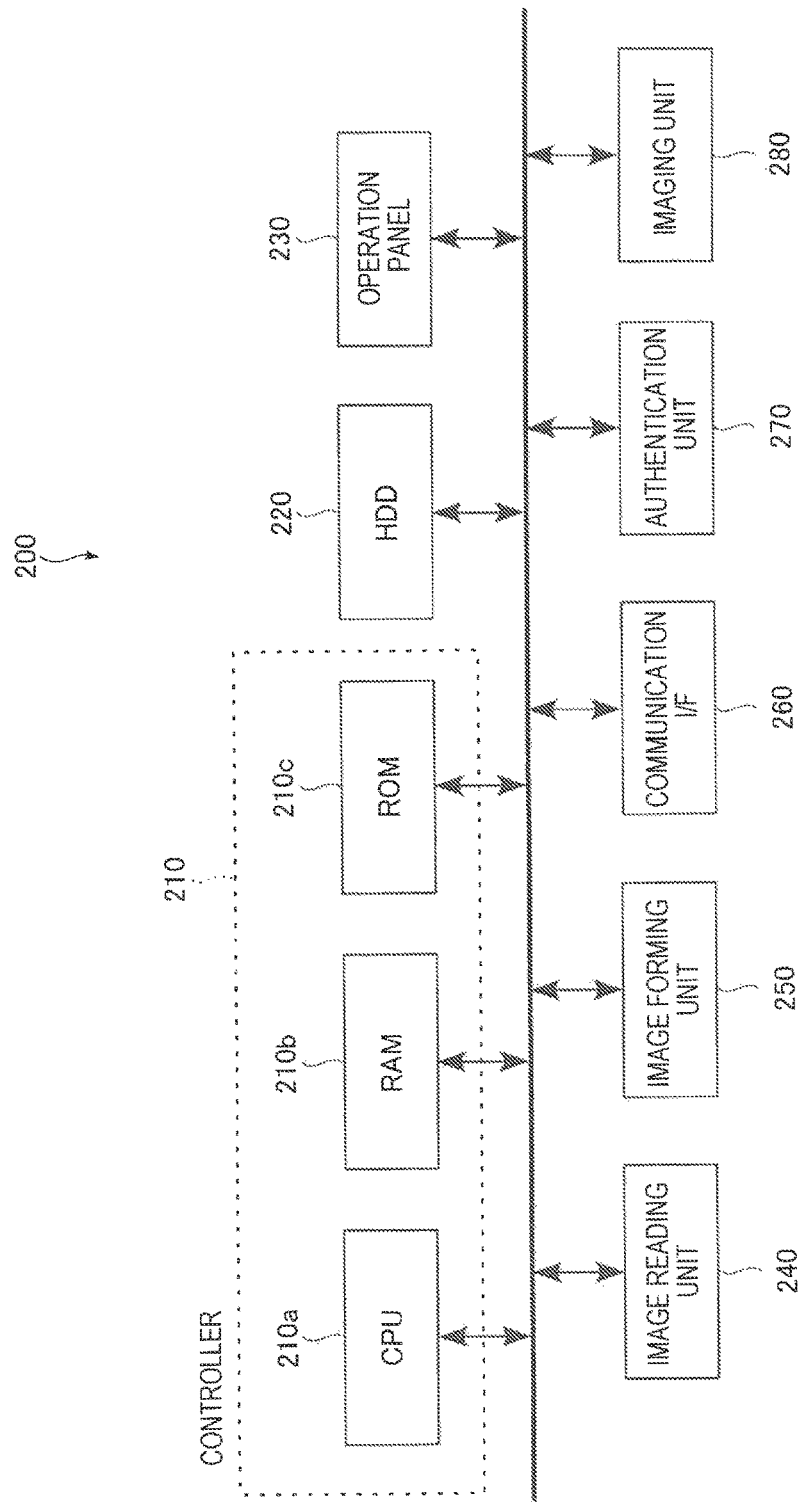
FIG. 3 is a view illustrating an exemplary hardware configuration of an image processing apparatus according to the first exemplary embodiment.

Next, a hardware configuration of the image processing apparatus 200 according to the present exemplary embodiment will be described. FIG. 3 is a view illustrating an exemplary hardware configuration of the image processing apparatus 200 according to the first exemplary embodiment. As illustrated in the figure, the image processing apparatus 200 includes a controller 210, a hard disk drive (HDD) 220, an operation panel 230, an image reading unit 240, an image forming unit 250, a communication I/F 260, an authentication unit 270, and an imaging unit 280.

The controller 210 controls the operations of the respective units of the image processing apparatus 200. The controller 210 includes a CPU 210a, a random access memory (RAM) 210b, and a read only memory (ROM) 210c.

The CPU 210a implements the respective functions in the image processing apparatus 200 by loading and executing various programs stored in the ROM 210c and the like into the RAM 210b. The RAM 210b is a memory (storage unit) used as a working memory or the like of the CPU 210a. The ROM 210c is a memory (storage unit) for storing various programs and the like to be executed by the CPU 210a.

The HDD 220 is a storage unit that stores various data. The HDD 220 stores, for example, image data generated by image reading by the image reading unit 240, image data received from the external by the communication I/F 260, and the like.

The operation panel 230 displays various kinds of information and receives instructions from a user for performing an operation using various functions. The operation panel 230 may be, for example, a touch panel display.

The image reading unit 240 reads an image recorded on a recording material such as paper and generates data of the read image (image data). In this example, the image reading unit 240 is, for example, a scanner which may employ a CCD system in which reflected light for light irradiated on a document from a light source is reduced by a lens and received by a charge coupled device (CCD), or a contact image sensor (CIS) system in which reflected light for light sequentially irradiated on a document from an LED light source is received by the CIS.

The image forming unit 250 is a printing mechanism for forming an image on a recording material such as paper. In this example, the image forming unit 250 is, for example, a printer which may employ an electrophotographic method in which a toner attached to a photoconductor is transferred onto a recording material to form an image, or an inkjet method in which ink is ejected onto a recording material to form an image.

The communication I/F 260 is a communication interface that exchanges various data with other apparatus/device such as the mobile terminal 300 and the management server 400. The communication I/F 260 includes an interface for performing wired communication and an interface (antenna) for performing wireless communication.

The authentication unit 270 reads an IC card containing an IC (integrated circuit) to record and calculate information, and acquires information recorded on the IC card.

The imaging unit 280 is a camera or the like which captures images (still image and moving image) around the image processing apparatus 200.

In the present exemplary embodiment, the image reading unit 240 and the image forming unit 250 are used as an example of an image processing unit.

FIG. 3 merely illustrates a hardware configuration of the image processing apparatus 200 suitable for application of the present exemplary embodiment. The present exemplary embodiment is not realized only with the illustrated configuration.

<Description of Positioning by Mobile Terminal>

Next, positioning by the mobile terminal 300 according to the present exemplary embodiment will be described. As described above, the mobile terminal 300 regularly performs the positioning based on the intensity of the radio wave received from the transmitter 100. This positioning is performed by a method of a related art using, for example, the equation 1 described below.

Equation 1 is generally called Friis transmission equation. In Equation 1, Power indicates the intensity of a radio wave emitted from the transmitter 100 and has the unit of dBm (decibel meter). Power is a value determined according to the model and settings of the transmitter 100 and is held in advance in the mobile terminal 300 or the management server 400 as a value for each transmitter 100. Received signal strength indication (RSSI) indicates the intensity of a radio wave actually received by the mobile terminal 300 from the transmitter 100 and has the unit of dBm. n is a constant related to the radio wave characteristics of space, which is, for example, 2 as an ideal value.

By putting a value of Power, a value (RSSI) of the intensity of the radio wave received from the transmitter 100 by the mobile terminal 300, and a value of n into Equation 1, a distance d between the mobile terminal 300 and the transmitter 100 is calculated.

$$d = 10^{(Power-RSSI)/(10n)} \qquad [\text{Eq. 1}]$$

The mobile terminal 300 performs such calculation of distance d for each of the transmitters 100 that received the radio waves. Then, when calculating a distance between the mobile terminal 300 and each transmitter 100, the mobile terminal 300 identifies its own position using a method of a related art such as three-point positioning.

In the present exemplary embodiment, it is assumed that the above-mentioned Friis transmission equation is used to perform the positioning, but the positioning method is not limited thereto. Any other methods may be used as long as the intensity of a radio wave received by the mobile terminal 300 from the transmitter 100 may be used to perform the positioning.

<Functional Configuration of Management Server>

Figure 4:
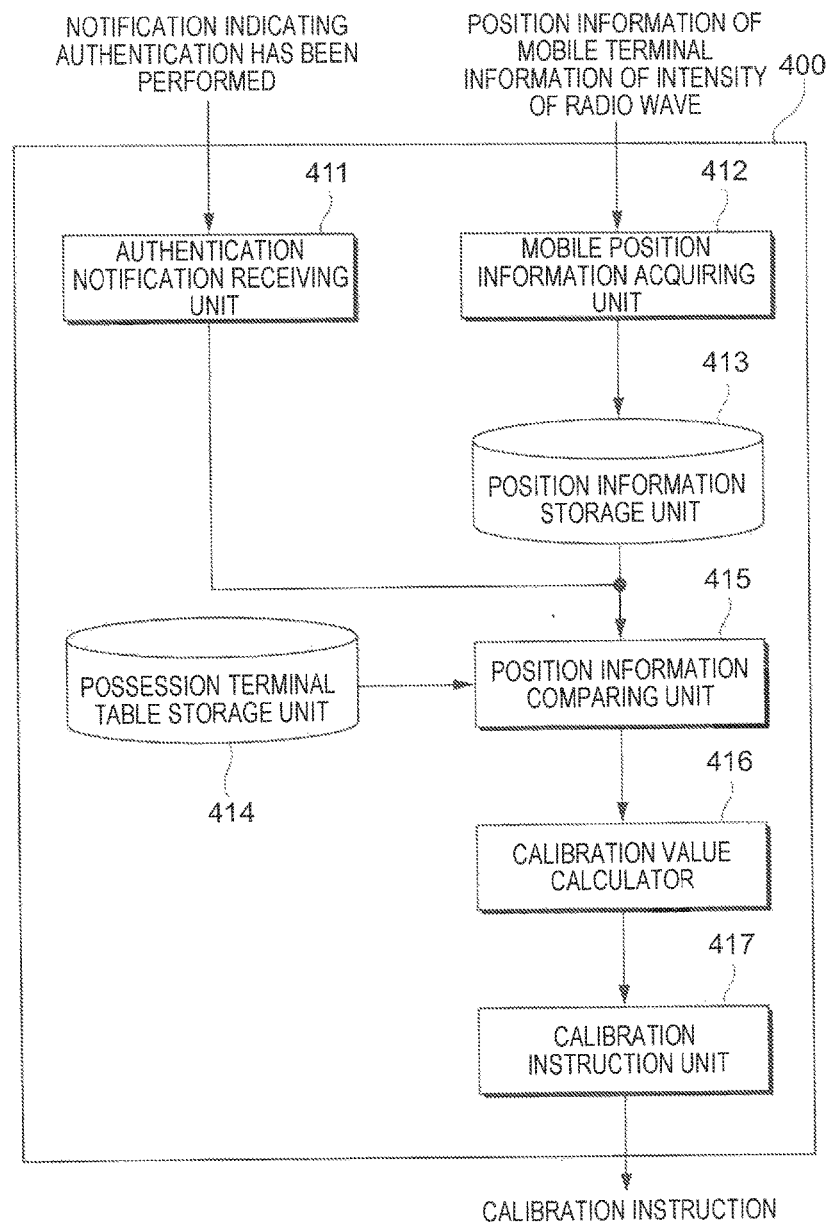
FIG. 4 is a block diagram illustrating an exemplary functional configuration of the management server according to the first exemplary embodiment.

Next, a functional configuration of the management server 400 according to the present exemplary embodiment will be described. FIG. 4 is a block diagram illustrating an exemplary functional configuration of the management server 400 according to the first exemplary embodiment. The management server 400 according to the present exemplary embodiment includes an authentication notification receiving unit 411, a mobile position information acquiring unit 412, a position information storage unit 413, a possession terminal table storage unit 414, a position information comparing unit 415, a calibration value calculator 416, and a calibration instruction unit 417.

The authentication notification receiving unit 411 receives from the image processing apparatus 200 a notification indicating that authentication for an operator has been performed. More specifically, when the operator performs an authentication operation for the image processing apparatus 200, the authentication notification receiving unit 411 receives from the image processing apparatus 200 a notification indicating that authentication for the operator has been performed. This notification includes information for identifying the operator, such as an ID, name and the like of the operator who performed the authentication, and a time at which the authentication has been performed with the image processing apparatus 200 (hereinafter referred to as an authentication time). The authentication time may be grasped as an example of the time when the operator performed an operation on the machine.

The mobile position information acquiring unit 412 acquires the position information obtained by the mobile terminal 300 of the operator. More specifically, as described above, since the mobile terminal 300 regularly performs the positioning and transmits the position information to the management server 400, the mobile position information acquiring unit 412 regularly acquires the position information from the mobile terminal 300. In addition, the mobile position information acquiring unit 412 also acquires, from the mobile terminal 300, information of the intensity of a radio wave actually received by the mobile terminal 300, together with the position information. These pieces of information acquired from the mobile terminal 300 are stored in the position information storage unit 413.

The position information storage unit 413 stores the position information of the mobile terminal 300 acquired by the mobile position information acquiring unit 412 and the information of the intensity of the radio wave received by the mobile terminal 300. In addition, the position information storage unit 413 stores in advance position information indicating positions at which each transmitter 100 and each image processing apparatus 200 are installed.

The possession terminal table storage unit 414 stores in advance a table in which an operator is associated with a mobile terminal 300 possessed by the operator for each operator (hereinafter referred to as a possession terminal table). For example, in the possession terminal table, an operator X is associated with a mobile terminal 300X. The possession terminal table shows that a mobile terminal 300 possessed by the operator X is the mobile terminal 300X. Further, for example, an operator Y is associated with a mobile terminal 300Y. The possession terminal table shows that a mobile terminal 300 possessed by the operator Y is the mobile terminal 300Y.

The position information comparing unit 415 compares a position of the image processing apparatus 200 with which the authentication for the operator has been performed (that is, the image processing apparatus 200 as a source of the notification received by the authentication notification receiving unit 411) and a position obtained from the position information of the mobile terminal 300 possessed by the operator for which the authentication has been performed to determine whether or not a difference between the two positions exceeds a predetermined criterion.

More specifically, when the authentication notification receiving unit 411 receives from the image processing apparatus 200 the notification indicating that the authentication has been performed, the position information comparing unit 415 acquires from the position information storage unit 413 the position information of the image processing apparatus 200 with which the authentication has been performed.

Further, by referring to the possession terminal table, the position information comparing unit 415 identifies a mobile terminal 300 which is associated in advance with an operator for which the authentication has been performed. Then, the position information comparing unit 415 acquires from the position information storage unit 413 the position information sent from the identified mobile terminal 300. In this example, the position information comparing unit 415 acquires position information, which is obtained (calculated) by the mobile terminal 300 at a time closest to the authentication time at which the authentication has been performed with the image processing apparatus 200, among the position information stored in the position information storage unit 413, as the position information sent from the identified mobile terminal 300. In other words, the position information comparing unit 415 acquires the position information obtained by the mobile terminal 300 within a predetermined time (e.g., within 1 second) from the authentication time, among the position information stored in the position information storage unit 413.

As a result of the comparison by the position information comparing unit 415, when it is determined that the difference between both of the positions exceeds the predetermined reference, the calibration value calculator 416 calculates a calibration value. This calibration value is a variable which is used when the mobile terminal 300 calculates the position information. In the present exemplary embodiment, the calibration value is a value of "n" in the Equation 1 described above.

More specifically, in order to obtain the calibration value, the calibration value calculator 416 puts a value (RSSI) of the intensity of the radio wave received by the mobile terminal 300 from the transmitter 100 and a value of Power into Equation 1. Further, d is substituted with a value of the distance between the image processing apparatus 200 with which the authentication for the operator has been performed and the transmitter 100 which is a transmission source of the radio wave received by the mobile terminal 300. This value of the distance is calculated from the position information of the image processing apparatus 200 and the position information of the transmitter 100, which are stored in the position information storage unit 413. By substituting this value, the value of "n" is calculated. This value of "n" is calculated for each transmitter 100 that is the transmission source of the radio wave received by the mobile terminal 300.

The calibration instruction unit 417 transmits the calibration value calculated by the calibration value calculator 416 to the mobile terminal 300 and instructs the mobile terminal 300 to perform a calibration. More specifically, as a calibration instruction, the calibration instruction unit 417 issues an instruction to change a value of a variable (that is, a value of "n" in Equation 1) which is used when the mobile terminal 300 calculates the position information.

In the present exemplary embodiment, the position information of the image processing apparatus 200 is not limited to the configuration stored in the position information storage unit 413. For example, the position information of the image processing apparatus 200 may be included in the notification received by the authentication notification receiving unit 411. In this case, the image processing apparatus 200 transmits the position information indicating the position of its own (the image processing apparatus 200) to the management server 400, for example each time the authentication for an operator is performed. In other words, each time the authentication for an operator is performed, the management server 400 acquires the position information of the image processing apparatus 200 with which the authentication has been performed.

Each of the functional units constituting the management server 400 illustrated in FIG. 4 is realized by cooperation of software and hardware resources. More specifically, in a case where the management server 400 is realized by the hardware configuration illustrated in FIG. 2, the functions of the authentication notification receiving unit 411, the mobile position information acquiring unit 412, the position information comparing unit 415, the calibration value calculator 416, the calibration instruction unit 417 and the like are realized, for example when the OS program and the application programs stored in the magnetic disk device 103 are read into the main memory 102 and executed by the CPU 101. Further, the position information storage unit 413 and the possession terminal table storage unit 414 are realized by a storage unit such as the magnetic disk device 103.

In the present exemplary embodiment, the mobile position information acquiring unit 412 is used as an example of a mobile position information acquiring unit. Further, the calibration instruction unit 417 is used as an example of an instruction unit.

<Specific Example of Series of Processes in Positioning System>

Figure 5:
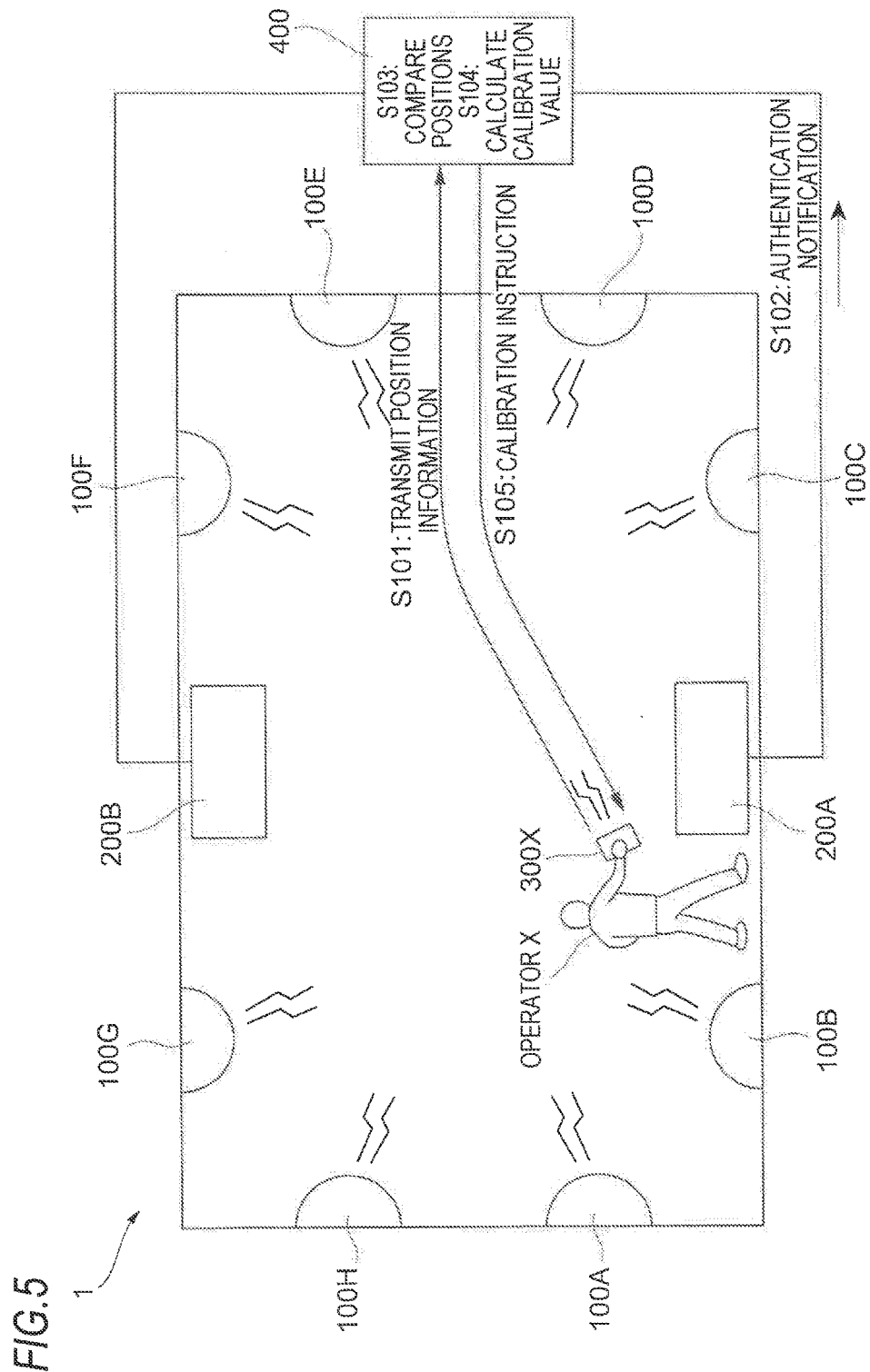
FIG. 5 is a view for explaining a specific example of a series of processes in the positioning system according to the first exemplary embodiment.

Next, a series of processes in the positioning system 1 according to the first exemplary embodiment will be described with a specific example. FIG. 5 is a view for explaining a specific example of a series of processes in the positioning system 1 according to the first exemplary embodiment. In the example illustrated in FIG. 5, it is assumed that an operator X possesses a mobile terminal 300X and performs printing with an image processing apparatus 200A.

The mobile terminal 300X regularly identifies its own position, calculates position information, and transmits the calculated position information to the management server 400 (step 101). In this example, the mobile terminal 300X first measures the intensities of radio waves received from the transmitters 100. In the example illustrated in FIG. 5, the mobile terminal 300X receives radio waves from the transmitter 100A, the transmitter 100B, the transmitter 100C, and the transmitter 100D, and measures the intensity of the radio wave received from each of the transmitters 100A to 100D. Next, the mobile terminal 300X uses Equation 1 to calculate a distance between each of the transmitters 100A to 100D and the mobile terminal 300X.

More specifically, for example, the mobile terminal 300X calculates a value of a distance d between the mobile terminal 300X and the transmitter 100A by putting the value (RSSI) of the intensity of the radio wave received by the mobile terminal 300X from the transmitter 100A, the value of Power and the value of n into Equation 1. Similarly, the mobile terminal 300X calculates a value of a distance d between the mobile terminal 300X and the transmitter 100B, a value of a distance d between the mobile terminal 300X and the transmitter 100C, and a value of a distance d between the mobile terminal 300X and the transmitter 100D. Next, the mobile terminal 300X calculates the position information of the mobile terminal 300X using a method such as three-point positioning, based on the calculated distances.

Then, the mobile terminal 300X transmits the calculated position information to the management server 400. In this example, the mobile terminal 300X also transmits information on the measured radio wave intensity (the intensity of the radio wave received from each of the transmitters 100A to 100D in the example illustrated in FIG. 5) to the management server 400. Thereby, the mobile position information acquiring unit 412 of the management server 400 acquires the position information of the mobile terminal 300X and the information of the radio wave intensity measured by the mobile terminal 300X. The information of the radio wave intensity is used for calculation of the calibration value by the calibration value calculator 416.

Further, when the operator X touches the IC card to the authentication unit 270 of the image processing apparatus 200A for authentication to perform printing with the image processing apparatus 200A, the image processing apparatus 200A notifies the management server 400 that the authentication for the operator X has been performed (step 102). Accordingly, the authentication notification receiving unit 411 of the management server 400 receives a notification indicating that the authentication for the operator X has been performed.

Next, the position information comparing unit 415 of the management server 400 compares a position obtained from the position information of the mobile terminal 300X with a position of the image processing apparatus 200A which is the notification source of the authentication to determine whether or not a position difference between them exceeds a predetermined criterion (step 103).

More specifically, upon receiving the notification indicating that the authentication has been performed with the image processing apparatus 200A, the position information comparing unit 415 acquires the position information of the image processing apparatus 200A from the position information storage unit 413. In addition, by referring to the possession terminal table, the position information comparing unit 415 identifies the mobile terminal 300 (the mobile terminal 300X in this example) which is associated in advance with the operator X for which the authentication has been performed. Next, the position information comparing unit 415 acquires position information, which is obtained by the mobile terminal 300X at a time closest to the authentication time, among the position information stored in the position information storage unit 413, as the position information sent from the identified mobile terminal 300X. Then, the position information comparing unit 415 determines whether or not the difference between the position of the image processing apparatus 200A and the position obtained from the position information of the mobile terminal 300X exceeds a predetermined criterion.

When it is determined that the difference between both of the positions exceeds the predetermined criterion, the calibration value calculator 416 calculates a calibration value (step 104). In this example, the calibration value calculator 416 puts the value (RSSI) of the intensity of the radio wave received by the mobile terminal 300X from the transmitter 100A and the value of Power into Equation 1. In addition, a value of distance between the image processing apparatus 200A and the transmitter 100A is substituted for the distance d. Accordingly, a value of "n" for the transmitter 100A is calculated. Similarly, the calibration value calculator 416 calculates a value of "n" for the transmitter 100B, a value of "n" for the transmitter 100C, and a value of "n" for the transmitter 100D.

Next, the calibration instruction unit 417 transmits the calibration value calculated by the calibration value calculator 416 to the mobile terminal 300X, and instructs the mobile terminal 300X to perform a calibration (step 105). In this example, the calibration instruction unit 417 instructs the mobile terminal 300X to use the value of "n" calculated by the calibration value calculator 416 in the calculation of Equation 1. In other words, the calibration instruction unit 417 makes an instruction to change the value of "n" for the transmitter 100A, the value of "n" for the transmitter 100B, the value of "n" for the transmitter 100C, and the value of "n" for the transmitter 100D to the value calculated by the calibration value calculator 416.

Thereafter, when the mobile terminal 300X performs the positioning, the new value of "n" calculated by the calibration value calculator 416 is used. Further, the calibration instruction unit 417 may transmit the value of "n" calculated by the calibration value calculator 416 not only to the mobile terminal 300X but also to a mobile terminal 300 possessed by another operator. As a result, the positioning using the new value of "n" calculated by the calibration value calculator 416 is performed not only with the mobile terminal 300X but also with another mobile terminal 300.

<Processing Procedure by Management Server>

Figure 6:
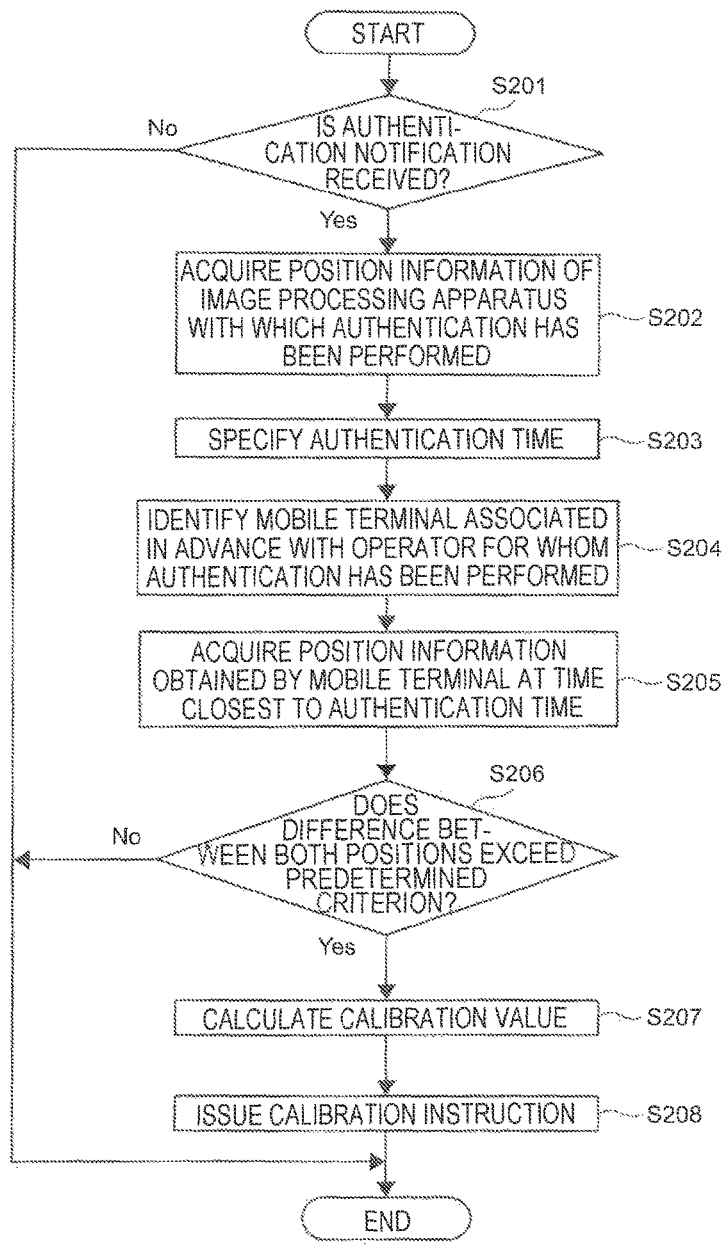
FIG. 6 is a flow chart illustrating an example of a processing procedure by the management server according to the first exemplary embodiment.

Next, a processing procedure by the management server 400 will be described. FIG. 6 is a flow chart illustrating an example of a processing procedure performed by the management server 400 according to the first exemplary embodiment. It is assumed that the processing procedure illustrated in FIG. 6 is repeatedly executed.

First, the position information comparing unit 415 determines whether or not the authentication notification receiving unit 411 has received a notification of authentication (step 201). When it is determined that the notification of authentication has not been received (No in the step 201), this process flow is ended. Meanwhile, when it is determined that the notification of authentication has been received (Yes in the step 201), the position information comparing unit 415 acquires from the position information storage unit 413 the position information of the image processing apparatus 200 with which the authentication has been performed (step 202).

Next, the position information comparing unit 415 specifies an authentication time at which the authentication has been performed with the image processing apparatus 200 (step 203). The authentication time information is included in the authentication notification received from the image processing apparatus 200. Next, by referring to the possession terminal table, the position information comparing unit 415 identifies a mobile terminal 300 which is associated in advance with an operator for which the authentication has been performed with the image processing apparatus 200 (step 204). The information of the operator for which the authentication has been performed is also included in the authentication notification received from the image processing apparatus 200.

Next, the position information comparing unit 415 acquires position information, which is obtained by the mobile terminal 300 at a time closest to the authentication time specified in the step 203, among the position information of the mobile terminal 300 stored in the position information storage unit 413 (the position information of the mobile terminal 300 identified in the step 204) (step 205). Next, the position information comparing unit 415 compares the position of the image processing apparatus 200 acquired in the step 202 with the position obtained from the position information of the mobile terminal 300 acquired in the step 205 to determine whether or not a difference between both of the positions exceeds a predetermined criterion (step 206).

When it is determined that the difference between both of the positions is equal to or smaller than the predetermined criterion (No in the step 206), it is determined that it is not necessary for the mobile terminal 300 to perform a calibration, and this process flow is ended. Meanwhile, if it is determined that the difference between both of the positions exceeds the predetermined criterion (Yes in the step 206), the calibration value calculator 416 calculates a calibration value (step 207). Then, the calibration instruction unit 417 transmits the calibration value calculated by the calibration value calculator 416 to the mobile terminal 300 and instructs the mobile terminal 300 to perform a calibration (step 208). Then, this process flow is ended.

As described above, the management server 400 according to the present exemplary embodiment compares the position obtained from the position information of the mobile terminal 300 of the operator and the position of the image processing apparatus 200 with which the authentication for the operator has been performed. Then, as a result of the comparison between both of the positions, when the difference between both of the positions exceeds the predetermined criterion, in other words, when decrease in the accuracy of the positioning in the mobile terminal 300 is detected, the mobile terminal 300 is instructed to perform a calibration.

For example, when the intensity of a radio wave received from the transmitter 100 is weakened or varied due to a change in environment such as battery residual capacity of the transmitter 100 and the arrangement of obstacles, the accuracy of the position information obtained by the mobile terminal 300 may decrease due to such variation. Therefore, the management server 400 according to the present exemplary embodiment issues a calibration instruction based on the difference between the position obtained from the position information of the mobile terminal 300 and the position of the image processing apparatus 200, thereby prevent the accuracy of the position information of the mobile terminal 300 from decreasing, as compared with a case where no calibration instruction is issued based on the difference between the position obtained from the position information of the mobile terminal 300 and the position of the image processing device 200.

In addition, in the present exemplary embodiment, the management server 400 makes comparison between positions at an opportunity when the operator performs an authentication operation for the image processing apparatus 200. However, the operation of the operator at this opportunity is not limited to the authentication operation. For example, any operation may be at an opportunity as long as an operator who operates the image processing apparatus 200 may be identified, such as an operation for the operator to input his/her ID and name to the image processing apparatus 200.

Second Exemplary Embodiment

Next, a second exemplary embodiment will be described.

In the first exemplary embodiment, the management server 400 compares the position obtained from the position information of the mobile terminal 300 with the position of the image processing apparatus 200 with which the authentication for the operator has been performed, and issues a calibration instruction based on a result of the comparison. In contrast, a management server 400 according to the second exemplary embodiment compares the position obtained from the position information of the mobile terminal 300 and an operator position obtained from an image captured by the imaging unit 280 of the image processing apparatus 200 and issues a calibration instruction based on a result of the comparison.

In other words, the image processing apparatus 200 according to the second exemplary embodiment has a function of analyzing a captured image. In the second exemplary embodiment, the image processing apparatus 200 constantly photographs the surroundings of its own by means of the imaging unit 280 and collects images (captured images). Then, the face of the operator is detected from the collected captured images and face collation is performed to grasp the identity of the operator. In addition, a position at which the operator exists is specified based on the detected position and size of the face.

In this manner, the image processing apparatus 200 records information on movement of the operator over time (operator's position, movement route, movement direction, movement speed, etc.) analyzed from the captured images. Then, for example, the recorded information is transmitted to the management server 400 at the timing of grasping the identity of the operator or regularly every minute. As a result, the management server 400 acquires the position information of the operator obtained from the captured images. In the second exemplary embodiment, the image processing apparatus 200 generates position information for operators within a range detectable by the imaging unit 280 without being limited to an operator who has operated the image processing apparatus 200.

In addition, the image processing apparatus 200 having the image analyzing function may reduce a load on a network between the image processing apparatus 200 and the management server 400 and a load on the management server 400, as compared with a configuration in which, for example, the image processing apparatus 200 transmits data of the captured images as it is to the management server 400 and the management server 400 makes the image analysis.

The positioning system 1 according to the second exemplary embodiment has the same overall configuration as that illustrated in FIG. 1. The mobile terminal 300 and the management server 400 according to the second exemplary embodiment have the same hardware configuration as those illustrated in FIG. 2. The image processing apparatus 200 according to the second exemplary embodiment has the same hardware configuration as that illustrated in FIG. 3. In this second exemplary embodiment, the same elements as in the first exemplary embodiment are denoted by the same reference numerals and detailed explanation of which will not be repeated.

<Functional Configuration of Management Server>

Figure 7:
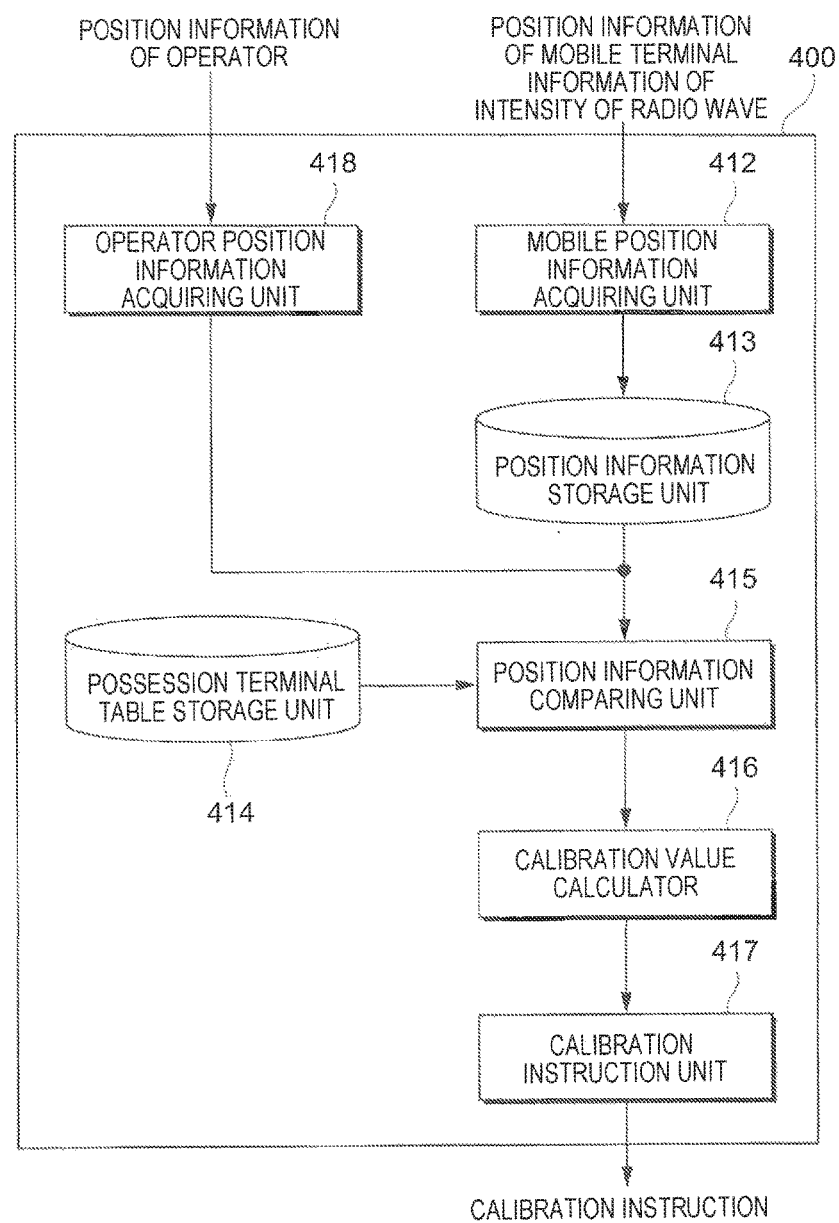
FIG. 7 is a block diagram illustrating an exemplary functional configuration of a management server according to a second exemplary embodiment.

Next, a functional configuration of the management server 400 according to the present exemplary embodiment will be described. FIG. 7 is a block diagram illustrating an exemplary functional configuration of the management server 400 according to the second exemplary embodiment.

The management server 400 according to the second exemplary embodiment is different from the management server 400 according to the first exemplary embodiment in that the management server 400 according to the second exemplary embodiment does not include the authentication notification receiving unit 411 but includes an operator position information acquiring unit 418.

The operator position information acquiring unit 418 acquires position information of an operator, which is obtained from an image captured by the imaging unit 280 of the image processing apparatus 200. Here, as described above, the image processing apparatus 200 captures an image of the surroundings of its own by means of the imaging unit 280, and transmits the position information of the operator obtained from the captured image to the management server 400, for example at a timing at which the identity of the operator is grasped or regularly every minute. As a result, the operator position information acquiring unit 418 acquires the position information of the operator obtained from the captured image.

In the second exemplary embodiment, the operator position information acquiring unit 418 is used as an example of an operator position information acquiring unit.

The position information comparing unit 415 compares the position obtained from the position information of the operator acquired by the operator position information acquiring unit 418 with the position obtained from the position information of the mobile terminal 300 acquired by the mobile position information acquiring unit 412 to determine whether or not a difference between both of the positions exceeds a predetermined criterion. As a result of the comparison by the position information comparing unit 415, when it is determined that the position difference exceeds the predetermined criterion, a calibration value is calculated by the calibration value calculator 416. This calculation of calibration value is performed in the same procedure as in the first exemplary embodiment.

More specifically, when the operator position information acquiring unit 418 acquires the position information of the operator, the position information comparing unit 415 specifies a time at which a captured image on which the position information is based is captured by the imaging unit 280 (hereinafter referred to as an imaging time). Further, by referring to the possession terminal table, the position information comparing unit 415 specifies a mobile terminal 300 which is associated in advance with an operator from whom the position information is obtained. Then, the position information comparing unit 415 acquires from the position information storage unit 413 the position information sent from the specified mobile terminal 300.

In this example, the position information comparing unit 415 acquires position information, which is obtained by the mobile terminal 300 at a time closest to the imaging time, among the position information stored in the position information storage unit 413, as the position information sent from the specified mobile terminal 300. In other words, the position information comparing unit 415 acquires the position information obtained by the mobile terminal 300 within a predetermined time (e.g., within 1 second) from the imaging time, among the position information stored in the position information storage unit 413.

In addition, the position information comparing unit 415 acquires the position information of the operator obtained from the captured image captured by the imaging unit 280 when the operator is at an arbitrary position (specific position) in the positioning system 1. Further, the position information comparing unit 415 acquires the position information obtained by the mobile terminal 300 possessed by the operator when the operator is at that position. Then, the position information comparing unit 415 determines whether or not a difference in position exceeds a predetermined criterion, based on the obtained position information of both.

<Specific Example of Series of Processes in Positioning System>

Figure 8:
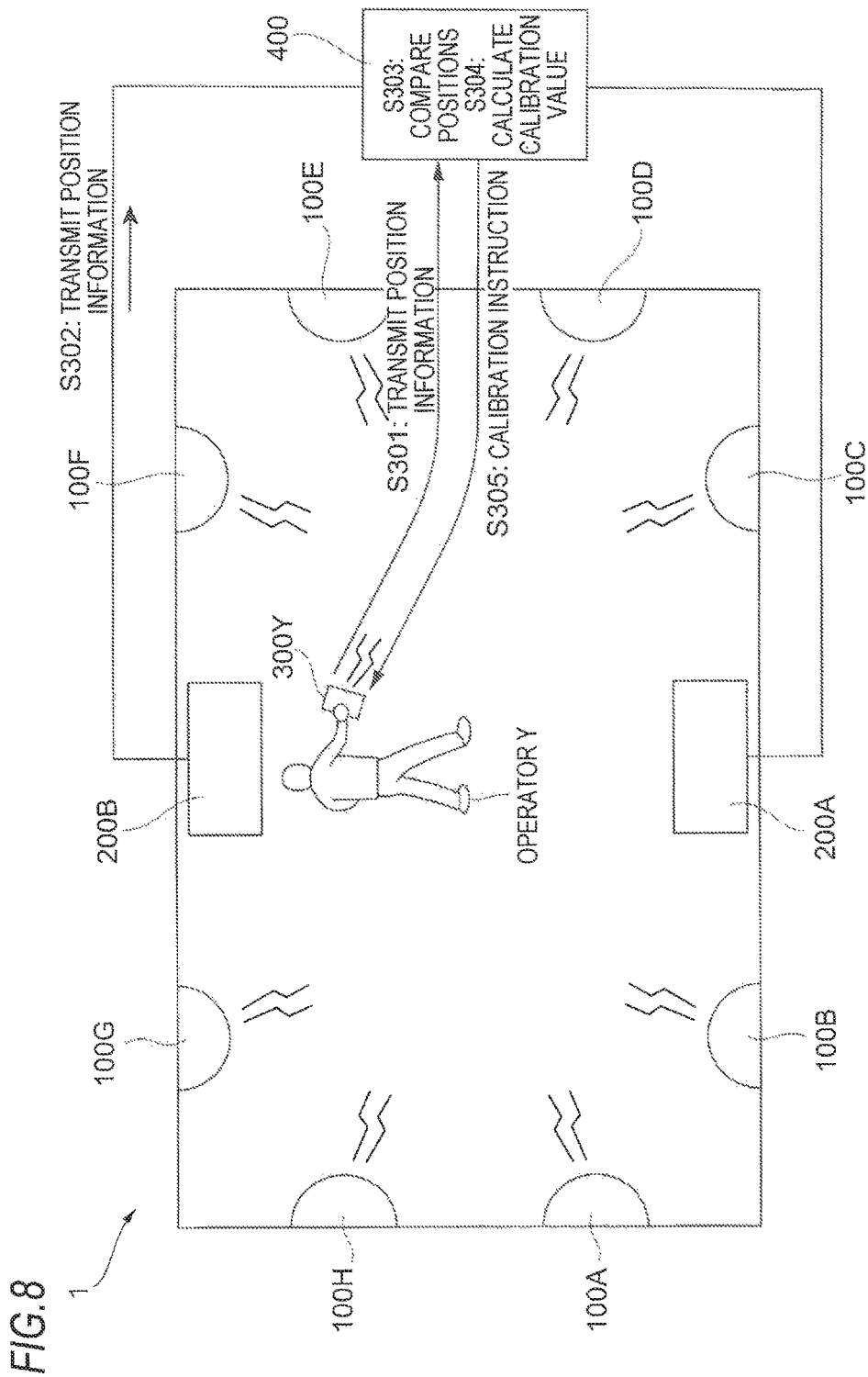
FIG. 8 is a view for explaining a specific example of a series of processes in a positioning system according to the second exemplary embodiment.

Next, a series of processes in the positioning system 1 according to the second exemplary embodiment will be described with a specific example. FIG. 8 is a view for explaining a specific example of a series of processes in the positioning system 1 according to the second exemplary embodiment. In the example illustrated in FIG. 8, it is assumed that an operator Y possesses a mobile terminal 300Y.

As in the first exemplary embodiment, the mobile terminal 300Y regularly identifies its own position, calculates position information, and transmits the calculated position information to the management server 400 (step 301). In the example illustrated in FIG. 8, the mobile terminal 300Y receives radio waves from a transmitter 100E, a transmitter 100F, and a transmitter 100G, and measures the intensity of the radio wave received from each of the transmitters 100E to 100G. Next, the mobile terminal 300Y uses Equation 1 to calculate a distance between each of the transmitters 100E to 100G and the mobile terminal 300Y. Next, the mobile terminal 300Y calculates the position information of the mobile terminal 300Y using a method such as three-point positioning, based on the calculated distances. Then, the mobile terminal 300Y transmits the calculated position information to the management server 400.

In this example, the mobile terminal 300Y also transmits information on the measured radio wave intensity (the intensity of the radio wave received from each of the transmitters 100E to 100G in the example illustrated in FIG. 8) to the management server 400. Thereby, the mobile position information acquiring unit 412 of the management server 400 acquires the position information of the mobile terminal 300Y and the information of the radio wave intensity measured by the mobile terminal 300Y. The information of the radio wave intensity is used for calculation of a calibration value by the calibration value calculator 416.

In addition, the image processing apparatus 200B constantly captures the surroundings of its own by means of the imaging unit 280. Then, for example, when identifying the operator Y with the captured image, the image processing apparatus 200B transmits the position information of the operator Y obtained from the captured image to the management server 400 (step 302). In this example, information on the imaging time at which the captured image on which the position information is based is captured by the imaging unit 280 is also transmitted. As a result, the operator position information acquiring unit 418 of the management server 400 acquires the position information of the operator Y obtained from the captured image and the information of the imaging time corresponding to the position information.

Next, the position information comparing unit 415 of the management server 400 compares a position obtained from the position information of the mobile terminal 300Y with a position obtained from the position information of the operator Y obtained from the captured image to determine whether or not a position difference between them exceeds a predetermined criterion (step 303).

More specifically, when the operator position information acquiring unit 418 acquires the position information of the operator Y, the position information comparing unit 415 identifies the imaging time. The position information comparing unit 415 refers to the possession terminal table to identify a mobile terminal 300 (the mobile terminal 300Y in this example) which is associated with the operator Y in advance. Next, the position information comparing unit 415 acquires position information, which is obtained by the mobile terminal 300Y at a time closest to the imaging time, among the position information stored in the position information storage unit 413, as the position information sent from the identified mobile terminal 300Y. Then, the position information comparing unit 415 determines whether or not the difference between the position obtained from the position information of the operator Y and the position obtained from the position information of the mobile terminal 300Y exceeds a predetermined criterion.

When it is determined that the difference between both of the positions exceeds the predetermined criterion, the calibration value calculator 416 calculates a calibration value (step 304). In this example, the calibration value calculator 416 uses Equation 1 to calculate a value of "n" for each of the transmitters 100E to 100G. Next, the calibration instruction unit 417 transmits the calibration value calculated by the calibration value calculator 416 to the mobile terminal 300Y, and instructs the mobile terminal 300Y to perform a calibration (step 305). Further, the calibration instruction unit 417 may transmit the value of "n" calculated by the calibration value calculator 416 not only to the mobile terminal 300Y but also to another mobile terminal 300.

<Processing Procedure by Management Server>

Figure 9:
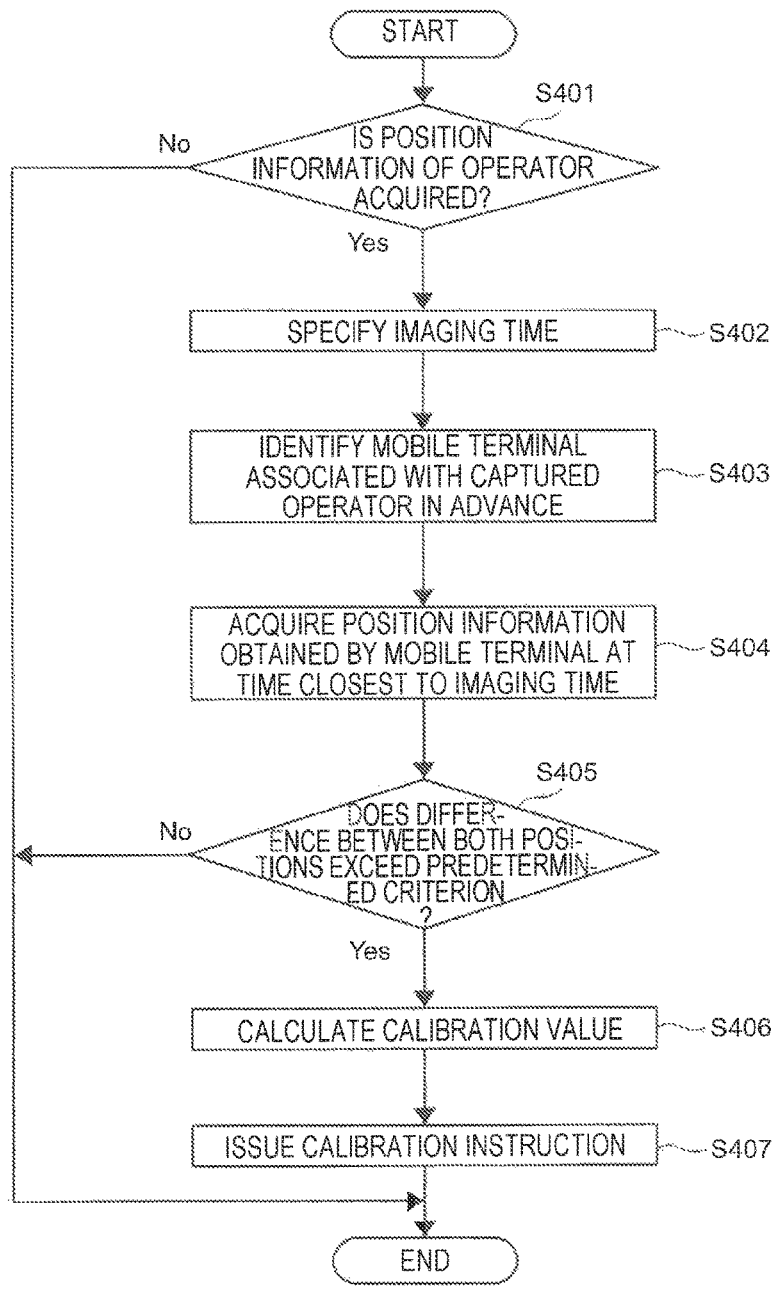
FIG. 9 is a flow chart illustrating an example of a processing procedure by the management server according to the second exemplary embodiment.

Next, a processing procedure by the management server 400 will be described. FIG. 9 is a flow chart illustrating an example of a processing procedure performed by the management server 400 according to the second exemplary embodiment. It is assumed that the processing procedure illustrated in FIG. 9 is repeatedly executed.

First, the position information comparing unit 415 determines whether or not the operator position information acquiring unit 418 has acquired the position information of the operator (step 401). When it is determined that the position information of the operator has not been acquired (No in the step 401), this process flow is ended. Meanwhile, when it is determined that the position information of the operator has been acquired (Yes in the step 401), the position information comparing unit 415 specifies the imaging time at which the captured image on which the acquired position information is based is captured (step 402). Next, the position information comparing unit 415 refers to the possession terminal table to identify a mobile terminal 300 which is associated with an captured operator in advance (step 403).

Next, the position information comparing unit 415 acquires position information, which is obtained by the mobile terminal 300 at a time closest to the imaging time specified in the step 402, among the position information of the mobile terminal 300 stored in the position information storage unit 413 (the position information of the mobile terminal 300 identified in the step 403) (step 404). Next, the position information comparing unit 415 compares the position obtained from the position information of the operator acquired in the step 401 with the position obtained from the position information of the mobile terminal 300 acquired in the step 404 to determine whether or not a difference between both of the positions exceeds a predetermined criterion (step 405).

When it is determined that the difference between both of the positions is equal to or smaller than the predetermined criterion (No in the step 405), it is determined that it is not necessary for the mobile terminal 300 to perform a calibration, and this process flow is ended. Meanwhile, when it is determined that the difference between both of the positions exceeds the predetermined criterion (Yes in the step 405), the calibration value calculator 416 calculates a calibration value (step 406). Then, the calibration instruction unit 417 transmits the calibration value calculated by the calibration value calculator 416 to the mobile terminal 300 and instructs the mobile terminal 300 to perform a calibration (step 407). Then, this process flow is ended.

As described above, the management server 400 according to the second exemplary embodiment compares the position obtained from the position information of the mobile terminal 300 with the operator's position obtained from the captured image captured by the imaging unit 280 of the image processing apparatus 200. Then, as a result of the comparison between both of the positions, when the difference between both of the positions exceeds the predetermined criterion, in other words, when decrease in the accuracy of the positioning in the mobile terminal 300 is detected, the mobile terminal 300 is instructed to perform a calibration. Therefore, even in a case where the operator does not operate the image processing apparatus 200, when decrease in the accuracy of the positioning is detected, a calibration instruction is issued to prevent the accuracy of the position information of the mobile terminal 300 from decreasing.

Further, in the first and second exemplary embodiments, the image processing apparatus 200 may perform the processing of the management server 400. In this case, the CPU 210a reads and executes a program realizing the authentication notification receiving unit 411, the mobile position information acquiring unit 412, the position information comparing unit 415, the calibration value calculator 416, the calibration instruction unit 417, and the operator position information acquiring unit 418, etc., for example, from the ROM 210c into the RAM 210b to realize these functional units. Further, the position information storage unit 413 and the possession terminal table storage unit 414 are realized by a storage unit such as the HDD 220.

Further, the program for realizing the exemplary embodiments of the present invention may be provided not only by a communication unit but also stored in a recording medium such as CD-ROM.

Although various embodiments and modifications have been described above, it should be understood that these exemplary embodiments and modifications may be used in combination.

Further, the present invention is not limited to the above embodiments at all, but may be implemented in different forms without departing from the spirit and scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a central processing unit (CPU) executing a program to:
acquire position information obtained by a mobile terminal possessed by an operator who operates a machine; and
issue an instruction concerning acquisition of the position information of the mobile terminal when a difference between a position obtained from the position information of the mobile terminal acquired and a position of the machine exceeds a predetermined first criterion,
wherein the instruction is an instruction concerning a calculation procedure for calculating the position information of the mobile terminal based on an intensity of a radio wave received by the mobile terminal from a transmitter that transmits the radio wave.

2. The information processing apparatus according to claim 1, wherein the CPU further executes the program to issue the instruction by using the position information which is obtained, as the position information of the mobile terminal, by the mobile terminal when the operator operates the machine.

3. The information processing apparatus according to claim 2, wherein the CPU further executes the program to issue the instruction by using the position information which is obtained, as the position information of the mobile terminal, by the mobile terminal within a predetermined time from a time when the operator operated the machine.

4. The information processing apparatus according to claim 1, wherein the instruction is an instruction to change a value of a variable used in the calculation procedure.

5. The information processing apparatus according to claim 1, wherein the CPU further executes the program to:
acquire position information of the operator which is obtained from an image captured by the machine; and
issue the instruction by using the position information of the operator acquired.

6. The information processing apparatus according to claim 5, wherein the CPU further executes the program to:
acquire the position information which is obtained by the mobile terminal when the operator is at a specific position;
acquire the position information of the operator obtained from a captured image which is captured when the operator is at the specific position; and
issue the instruction to the mobile terminal when a difference between the position obtained from the position information of the mobile terminal and a position obtained from the position information of the operator exceeds a predetermined second criterion.

7. An image processing apparatus comprising:
a central processing unit (CPU) executing a program to:
perform image processing;
acquire position information obtained by a mobile terminal possessed by an operator who operates the image processing apparatus; and
issue an instruction concerning acquisition of the position information of the mobile terminal when a difference between a position obtained from the position information of the mobile terminal acquired and a position of the image processing apparatus exceeds a predetermined criterion,
wherein the instruction is an instruction concerning a calculation procedure for calculating the position information of the mobile terminal based on an intensity of a radio wave received by the mobile terminal from a transmitter that transmits the radio wave.

8. A non-transitory computer readable storage medium storing a program that, when executed, causes a computer to execute a process comprising:
acquiring position information obtained by a mobile terminal possessed by an operator who operates a machine; and
issuing an instruction concerning acquisition of the position information of the mobile terminal when a difference between a position obtained from the acquired position information of the mobile terminal and a position of the machine exceeds a predetermined criterion,
wherein the instruction is an instruction concerning a calculation procedure for calculating the position information of the mobile terminal based on an intensity of a radio wave received by the mobile terminal from a transmitter that transmits the radio wave.

* * * * *